Aug. 5, 1930.  F. E. CARLSON  1,772,277

WEIGHING SCALE

Filed April 10, 1928

Inventor
Frederick E Carlson
By his Attorneys

Patented Aug. 5, 1930

1,772,277

UNITED STATES PATENT OFFICE

FREDERICK E. CARLSON, OF NEW BRITAIN, CONNECTICUT, ASSIGNOR TO LANDERS, FRARY & CLARK, OF NEW BRITAIN, CONNECTICUT, A CORPORATION OF CONNECTICUT

WEIGHING SCALE

Application filed April 10, 1928. Serial No. 268,876.

This invention relates to weighing scales.

It is an object of the invention to provide a scale in which the fluctuating movements of the registering element, under the application of a load, are damped so that the registering element comes to a quick stop. It is a further object of the invention to provide a damping device that is economical to produce and one that does not interfere with the proper action of the scale parts.

With these general objects in view the invention consists in the features, combination, details of construction and arrangements of parts which will first be described in connection with the accompanying drawing and then more particularly pointed out.

In the drawing—

Figure 1:
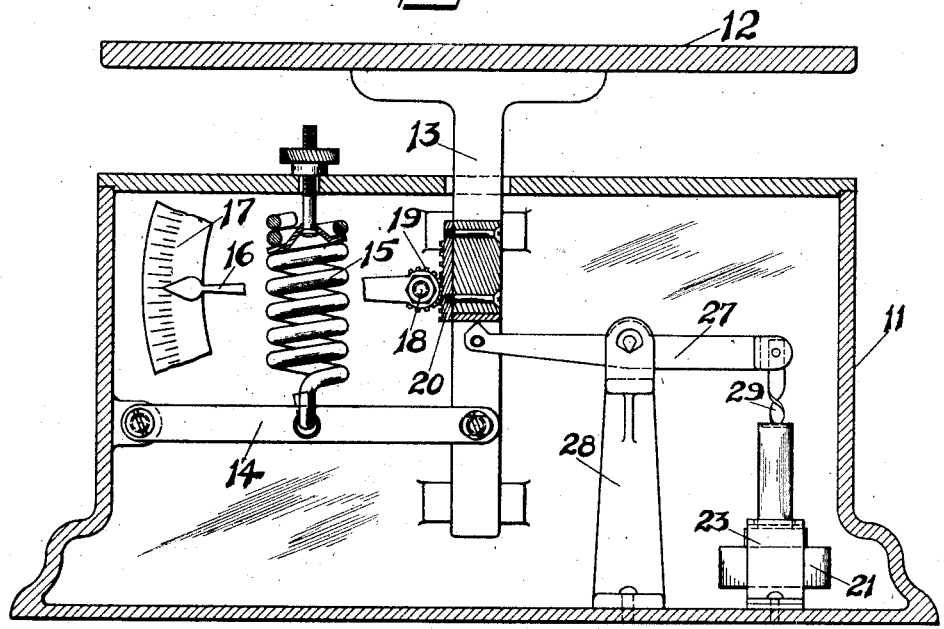
Figure 1 is a view in vertical section of a weighing scale constructed in accordance with the invention.
Figure 2:
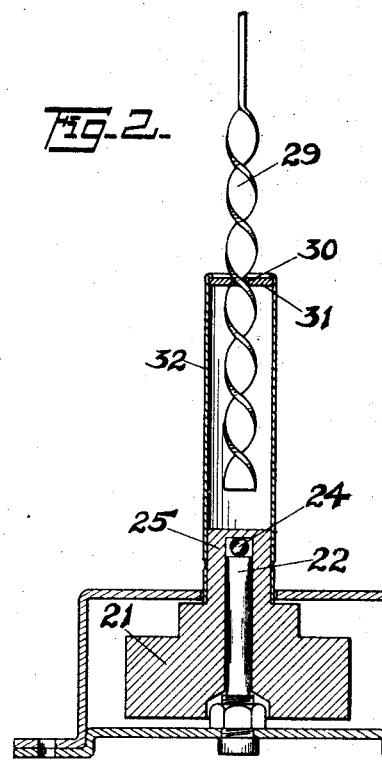
Figure 2 is a detail view showing the damping device in enlarged vertical section.
Figure 3:
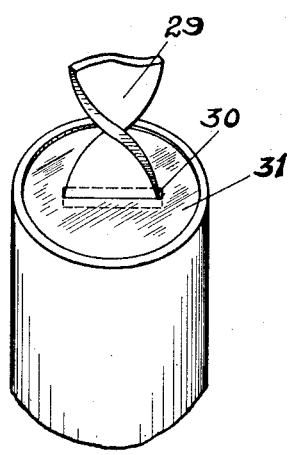
Figure 3 is a perspective view (enlarged) of part of the damping device.

Referring to the drawing, 11 is the housing of a scale illustrated by way of example, more or less conventionally as to its common elements. The scale platform 12 is mounted on a frame or support 13 movable in the housing. This frame is guided in its movement by links 14 of which one shows in Fig. 1. Connected between each link and the housing is a scale spring 15.

In order to register the weight carried by the platform, a pointer 16, extending over a dial 17, swings upon movement of the scale platform and its supporting frame. To this end, the pointer is pivoted at 18 and has a pinion 19 meshing with a rack 20 carried on part of the platform frame.

So much of the scale as has been described is of known construction. With a scale so constructed, when an article is dropped or abruptly placed on the scale platform, there results a pointer fluctuation that continues for a considerable time. In other words, it is a considerable time before the pointer stops at the indicated weight on the dial.

The present invention includes means for damping pointer fluctuations so that the pointer will quickly come to a stop under even an abrupt application of load on the scale platform. This may be acomplished by opposing reversals in the direction of movement of the moving parts by a considerable force of inertia. In structures embodying the invention to what is now considered the best advantage, this opposing force will be obtained by the rotation of a weighted body which is reversed when the platform frame is reversed. Although capable of various constructions, in that here shown as an example, the weighted body comprises a relatively heavy wheel 21. This wheel is rotatably mounted on a post 22 secured to a wheel housing 23 on the base of the scale housing. To provide free rotation, a ball bearing 24 is interposed between the top of post 22 and the end of a cylindrical extension 25 on the wheel.

There is provided a connection between the wheel and the moving parts of the scale for causing movement of the scale parts to rotate the weighted wheel. Although capable of various constructions, in that here shown as an example, pivoted to the movable platform 13 is a lever 27 fulcrumed in a bracket 28. Extending downwardly from the other end of this lever is a plunger 29. This plunger is formed from a flat strip of metal twisted into cork-screw shape. That is, the plunger is in the nature of a screw of coarse pitch.

The plunger 29 passes through a slot 30 formed in a nut-like plate 31 secured in the upper end of a tube 32 secured to extension 25 on the weighted wheel. The slot 30 is formed to cooperate with the plunger whereby the plate 31 (and consequently the tube 32 and weight 21) is rotated as the plunger moves. As shown, each side wall of the slot is reversely beveled to accord with the screw formation of the plunger. The slot is so dimensioned that the plunger is free, i. e. loose, in the slot when the parts are in a state of rest.

As the plunger moves down it causes the tube and hence the wheel, to rotate clockwise. Similarly, upward movement of the plunger rotates the wheel counterclockwise.

The movement of the plunger corresponds to the movement of the removable scale parts, namely, the platform, frame and pointer. Each time the frame reverses its direction of movement the lever and plunger are reversed and hence the rotation of the weighted wheel is reversed. Consequently, the considerable force necessary to overcome the inertia of the rotating wheel, in stopping the wheel and starting a reversed rotation, is opposed to reversals in the direction of movement of the scale frame. As a result, the fluctuations are damped and the pointer quickly comes to a stop.

With the construction described, the corkscrew plunger, when in a state of rest is always free in the slot. As a result, there is no binding of the parts and the proper registration of true weight is not interfered with by the damping device.

What I claim is:

1. In a scale, and in combination, a reciprocable platform frame, a scale spring, a registering device actuated by the movement of said frame, a rotatable weight, and means for causing movement of the platform frame to rotate said weight.

2. In a scale, and in combination, a reciprocable platform frame, a scale spring, a registering device actuated by the movement of said frame, a rotatable weight, a reciprocating plunger, means for causing movement of said frame to move said plunger, and means for causing movement of said plunger to rotate said weight.

3. In a scale, and in combination, a reciprocable platform frame, a scale spring, a registering device actuated by the movement of said frame, a rotatable weight, a reciprocating plunger having a portion thereof formed with a thread of coarse pitch, a complementary nut-like element connected with said weight and through which said plunger operates, whereby the weight is rotated upon movement of the plunger, and an operating connection between said plunger and the platform frame.

4. In a scale, and in combination, a reciprocable platform frame, a scale spring, a registering device actuated by the movement of said frame, a rotatable weight, a plunger formed of a strip of metal having at least a portion of its length twisted into cork-screw formation, a nut-like plate having a slot formed to cooperate with the plunger to cause the plate to turn upon movement of the plunger, said slot being dimensioned to leave the plunger free when in a state of rest, a connection between said plate and the weight, and a connection between said plunger and the platform frame.

5. In a scale and in combination, a reciprocable platform frame, a registering device actuated by the movement of said frame, a scale spring, a rotatable weight, and means for translating movement of the frame into rotation of said weight and for reversing the direction of rotation of said weight upon reversal of the direction of movement of said frame.

In testimony whereof, I have hereunto set my hand.

FREDERICK E. CARLSON.